US009183806B2

(12) United States Patent
Felt

(10) Patent No.: US 9,183,806 B2
(45) Date of Patent: Nov. 10, 2015

(54) ADJUSTING FONT SIZES

(75) Inventor: Michelle Felt, Randolph, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 216 days.

(21) Appl. No.: 13/167,432

(22) Filed: Jun. 23, 2011

(65) Prior Publication Data

US 2012/0327123 A1 Dec. 27, 2012

(51) Int. Cl.
*G06T 11/00* (2006.01)
*G09G 5/00* (2006.01)
*G09G 5/26* (2006.01)

(52) U.S. Cl.
CPC .. *G09G 5/00* (2013.01); *G09G 5/26* (2013.01); *G09G 2340/14* (2013.01); *G09G 2354/00* (2013.01)

(58) Field of Classification Search
USPC .......................................................... 345/472
See application file for complete search history.

(56) References Cited

U.S. PATENT DOCUMENTS 6,386,707 B1 * 5/2002 Pellicano ...................... 351/246
7,583,253 B2 * 9/2009 Jeng et al. ..................... 345/156
2002/0085123 A1 * 7/2002 Ono .............................. 348/584
2003/0071832 A1 * 4/2003 Branson ........................ 345/698
2003/0093600 A1 * 5/2003 Perala et al. .................... 710/72
2005/0229200 A1 * 10/2005 Kirkland et al. ................ 725/12
2005/0286125 A1 * 12/2005 Sundstrom et al. ........... 359/462
2007/0065010 A1 * 3/2007 Shie et al. ...................... 382/173
2007/0202858 A1 * 8/2007 Yu .............................. 455/414.1
2008/0049020 A1 * 2/2008 Gusler et al. .................. 345/427
2009/0164896 A1 * 6/2009 Thorn ........................... 715/700
2009/0197615 A1 * 8/2009 Kim et al. .................. 455/456.1
2010/0103197 A1 * 4/2010 Liu ............................... 345/660
2010/0174421 A1 * 7/2010 Tsai et al. ..................... 700/302
2010/0184487 A1 * 7/2010 Takada ....................... 455/569.1
2011/0069841 A1 * 3/2011 Angeloff et al. ................ 381/17
2011/0193838 A1 * 8/2011 Hsu .............................. 345/207

OTHER PUBLICATIONS

Siewiorek, Daniel P., et al. "SenSay: A Context-Aware Mobile Phone." ISWC. vol. 3. 2003. http://www.cs.cmu.edu/afs/cs.cmu.edu/Web/People/aura/docdir/sensay_iswc.pdf.*

* cited by examiner

*Primary Examiner* — Ming Hon
*Assistant Examiner* — Sarah Le

(57) ABSTRACT

A device may determine a baseline size of a font, obtain a distance between a user and a mobile device when the baseline size is determined, determine, via a sensor, a current distance between the mobile device and the user, determine a target size of the font based on the current distance, the distance, and the baseline size, set a current size of the font to the target size of the font, and display, on the mobile device, characters in the font having the target size.

20 Claims, 8 Drawing Sheets

FIG. 1A
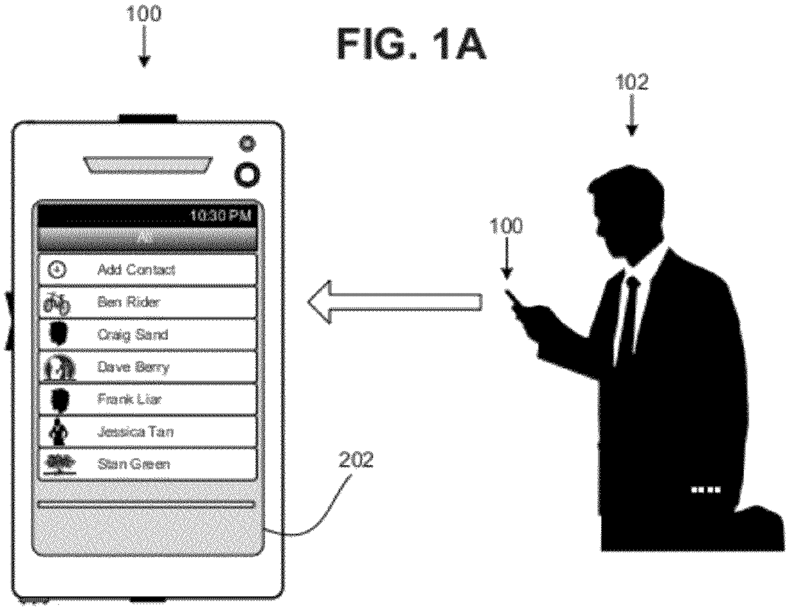
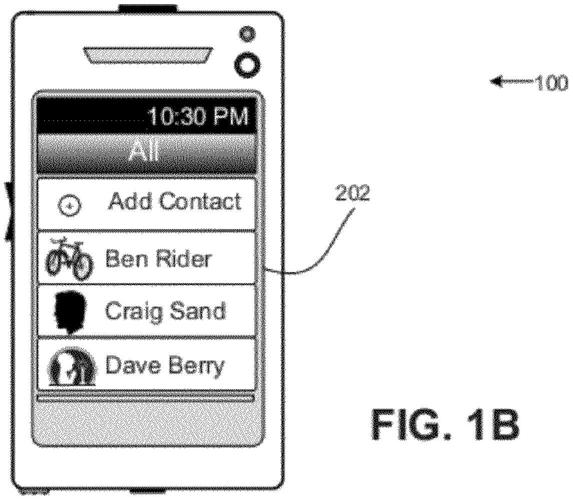
FIG. 1B

ADJUSTING FONT SIZES

BACKGROUND INFORMATION

Many of today's hand-held communication devices can automatically perform tasks that, in the past, were performed by the users. For example, a smart phone may monitor its input components (e.g., a keypad, touch screen, control buttons, etc.) to determine whether the user is actively using the phone. If the user has not activated one or more of its input components within a prescribed period of time, the smart phone may curtail its power consumption (e.g., turn off the display). In the past, a user had to turn off a cellular phone in order to prevent the phone from unnecessarily consuming power.

In another example, a smart phone may show images in either the portrait mode or the landscape mode, adapting the orientation of its images relative to the direction in which the smart phone is held by the user. In the past, the user had to adjust the direction in which the phone was held, for the user to view the images in their proper orientation.

BRIEF DESCRIPTION OF THE DRAWINGS

FIGS. 1A and 1B illustrate concepts described herein;

DETAILED DESCRIPTION OF PREFERRED EMBODIMENTS

The following detailed description refers to the accompanying drawings. The same reference numbers in different drawings may identify the same or similar elements.

As described below, a device may allow the user to easily recognize or read text on the display of the device or hear sounds from the device. After the user calibrates the device, the device may adapt its font sizes, image sizes, and/or speaker volume, depending on the distance between the user and the device. Optionally, the user may adjust the aggressiveness with which the device changes its font/image sizes and/or volume. Furthermore, the user may turn off the font/image-size or volume adjusting capabilities of the device.

FIGS. 1A and 1B illustrate the concepts described herein. FIG. 1A shows a device 100 and a user 102. Assume that user 102 interacts with device 100, and selects the optimal font sizes and/or speaker volume for user 102 at a particular distance between user 102 and device 100. When user 102 accesses a contact list in device 100, device 100 shows the contact list to user on its display 202. Device 100 may also be generating sounds for user 102 (e.g., device 100 is playing music).

FIG. 1B shows the contact list on device 100 when user 102 holds device 100 further away from user 102 than that shown in FIG. 1A. When user 102 increases the distance between user 102 and device 100, device 100 senses the change in distance and enlarges the font of the contact list, as shown in FIG. 1B. If device 100 is playing music, device 100 may also increase the volume. In changing the volume, device 100 may take into account the ambient noise level (e.g., increase the volume further if there is more background noise).

Without the automatic font adjustment capabilities of device 100, if user 102 is near-sighted or has other issues with vision, reading small fonts can be difficult for user 102. This may be especially true with higher resolution display screens, which tend to render the fonts smaller than those shown on lower resolution screens. In some situations, user 102 may find looking for a pair of glasses to use device 100 cumbersome and annoying, especially when user 102 is rushing to answer an incoming call on device 100 or using display 202 at inopportune moments when the pair of glasses is not at hand. Although some mobile devices (e.g., smart phones) provide for options to enlarge or reduce screen images, such options may not be effective for correctly adjusting font sizes.

Analogously, device 100 may aid user 102 in hearing sounds from device 100, without user 102 having to manually modify its volume. For example, when user 102 changes the distance between device 100 and user 102 or when the ambient noise level around device 100 changes, device 100 may modify its volume.

Figure 2A:
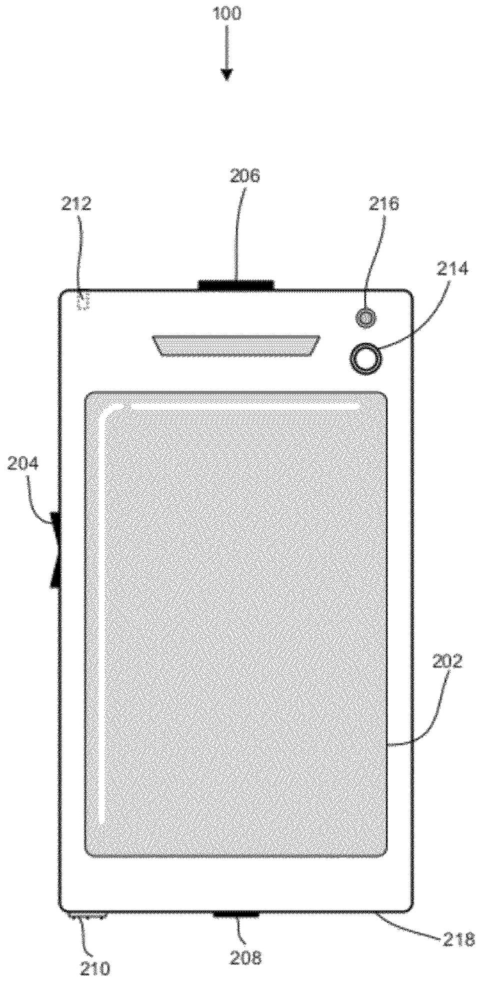
FIGS. 2A and 2B are the front and rear views of the exemplary device of FIGS. 1A and 1B.
Figure 2B:
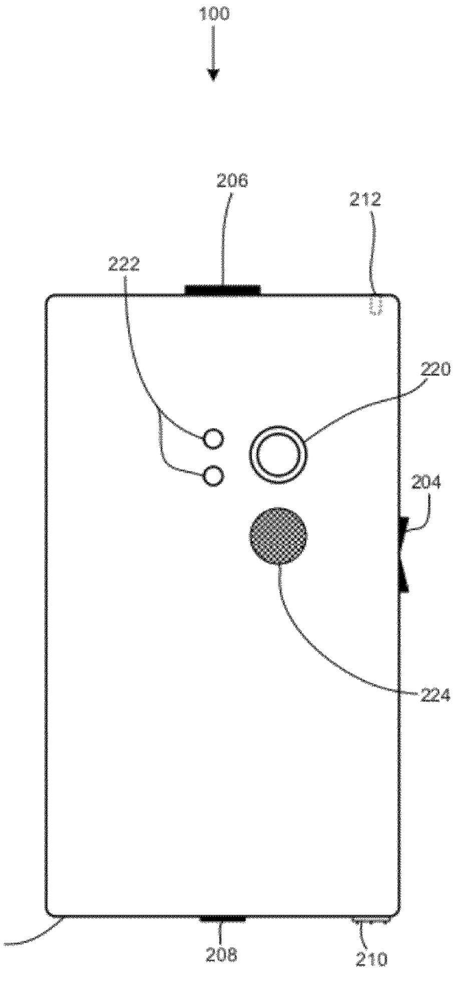

FIGS. 2A and 2B are front and rear views of device 100 according to one implementation. Device 100 may include any of the following devices that have the ability to or are adapted to display images, such as a cellar telephone (e.g., smart phone): a tablet computer; an electronic notepad, a gaming console, a laptop, and/or a personal computer with a display; a personal digital assistant that includes a display; a multimedia capturing/playing device; a web-access device; a music playing device; a digital camera; or another type of device with a display, etc.

As shown in FIGS. 2A and 2B, device 100 may include a display 202, volume rocker 204, awake/sleep button 206, microphone 208, power port 210, speaker jack 212, front camera 214, sensors 216, housing 218, rear camera 220, light emitting diodes 222, and speaker 224. Depending on the implementation, device 100 may include additional, fewer, different, or different arrangement of components than those illustrated in FIGS. 2A and 2B.

Display 202 may provide visual information to the user. Examples of display 202 may include a liquid crystal display (LCD), a plasma display panel (PDF), a field emission display (FED), a thin film transistor (TFT) display, etc. In some implementations, display 202 may also include a touch screen that can sense contacting a human body part (e.g., finger) or an object (e.g., stylus) via capacitive sensing, surface acoustic wave sensing, resistive sensing, optical sensing, pressure sensing, infrared sensing, and/or another type of sensing technology. The touch screen may be a single-touch or multi-touch screen.

Volume rocker 204 may permit user 102 to increase or decrease speaker volume. Awake/sleep button 206 may put device 100 into or out of the power-savings mode. Microphone 208 may receive audible information and/or sounds from the user and from the surroundings. The sounds from surroundings may be used to measure ambient noise. Power port 210 may allow power to be received by device 100, either from an adapter (e.g., an alternating current (AC) to direct current (DC) converter) or from another device (e.g., computer).

Speaker jack 212 may include a plug into which one may attach speaker wires (e.g., headphone wires), so that electric signals from device 100 can drive the speakers, to which the speaker wires run from speaker jack 212. Front camera 214 may enable the user to view, capture, store, and process images of a subject in/at front of device 100. In some implementations, front camera 214 may be coupled to an auto-focusing component or logic and may also operate as a sensor.

Sensors 216 may collect and provide, to device 100, information pertaining to device 100 (e.g., movement, orientation, etc.), information that is used to aid user 102 in capturing images (e.g., for providing information for auto-focusing), and/or information tracking user 102 or user 102's body part (e.g., user 102's eyes, user 102's head, etc.). Some sensors may be affixed to the exterior of housing 218, as shown in FIG. 2A, and other sensors may be inside housing 218.

For example, sensor 216 that measures acceleration and orientation of device 100 and provides the measurements to the internal processors of device 100 may be inside housing 218. In another example, external sensors 216 may provide the distance and the direction of user 102 relative to device 100. Examples of sensors 216 include a micro-electro-mechanical system (MEMS) accelerometer and/or gyroscope, ultrasound sensor, infrared sensor, heat sensor/detector, etc.

Housing 218 may provide a casing for components of device 100 and may protect the components from outside elements. Rear camera 220 may enable the user to view, capture, store, and process images of a subject in/at back of device 100. Light emitting diodes 222 may operate as flash lamps for rear camera 220. Speaker 224 may provide audible information from device 100 to a user/viewer of device 100.

Figure 3:
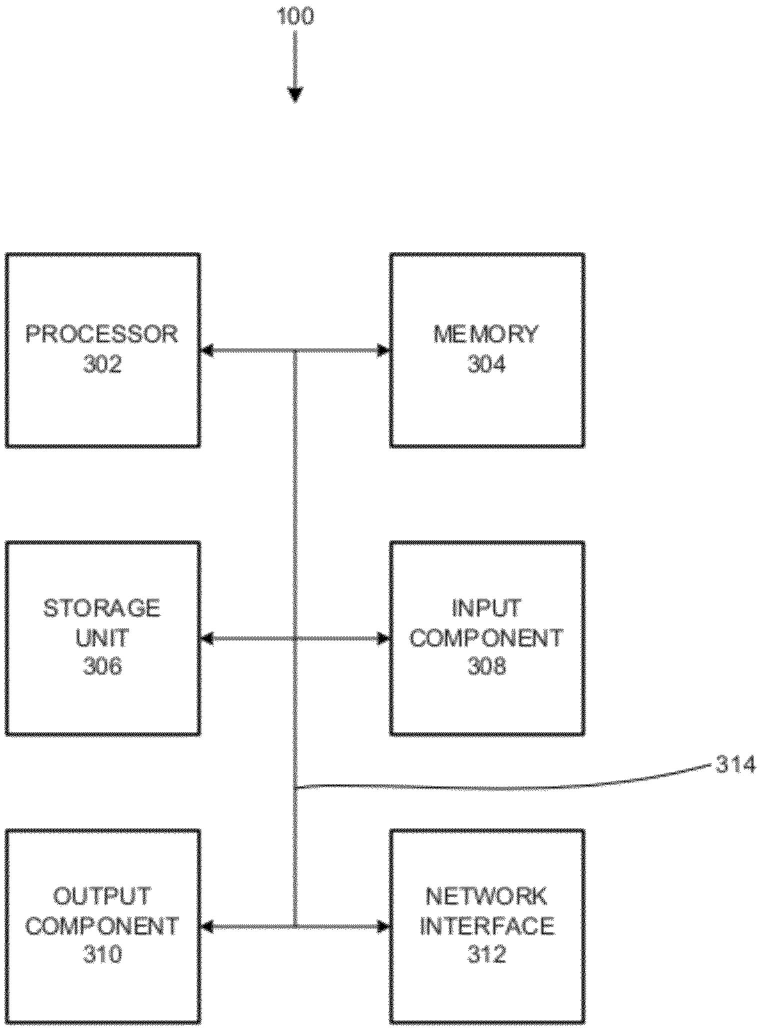
FIG. 3 is a block diagram of exemplary components of the device of FIGS. 1A and 1B.

FIG. 3 is a block diagram of exemplary components of device 100. As shown, device 100 may include a processor 302, memory 304, storage unit 306, input component 308, output component 310, network interface 312, and communication path 314. In different implementations, device 100 may include additional, fewer, different, or different arrangement of components than the ones illustrated in FIG. 3. For example, device 100 may include line cards for connecting to external buses.

Processor 302 may include a processor, a microprocessor, an Application Specific Integrated Circuit (ASIC), a Field Programmable Gate Array (FPGA), and/or other processing logic (e.g., embedded devices) capable of controlling device 100. Memory 304 may include static memory, such as read only memory (ROM), and/or dynamic memory, such as random access memory (RAM), or onboard cache, for storing data and machine-readable instructions (e.g., programs, scripts, etc.). Storage unit 306 may include a floppy disk, CD ROM, CD read/write (R/W) disc, and/or flash memory, as well as other types of storage devices (e.g., hard disk drive) for storing data and/or machine-readable instructions (e.g., a program, script, etc.).

Input component 308 and output component 310 may provide input and output from/to a user to/from device 100. Input/output components 308 and 310 may include a display screen, a keyboard, a mouse, a speaker, a microphone, a camera, a DVD reader, Universal Serial Bus (USB) lines, and/or other types of components for converting physical events or phenomena to and/or from signals that pertain to device 100.

Network interface 312 may include a transceiver (e.g., a transmitter and a receiver) for device 100 to communicate with other devices and/or systems. For example, via network interface 312, device 100 may communicate over a network, such as the Internet, an intranet, a terrestrial wireless network (e.g., a WLAN, WiFi, WiMax, etc.), a satellite-based network, optical network, etc. Network interface 312 may include a modem, an Ethernet interface to a LAN, and/or an interface/connection for connecting device 100 to other devices (e.g., a Bluetooth interface).

Communication path 314 may provide an interface through which components of device 100 can communicate with one another.

Figure 4:
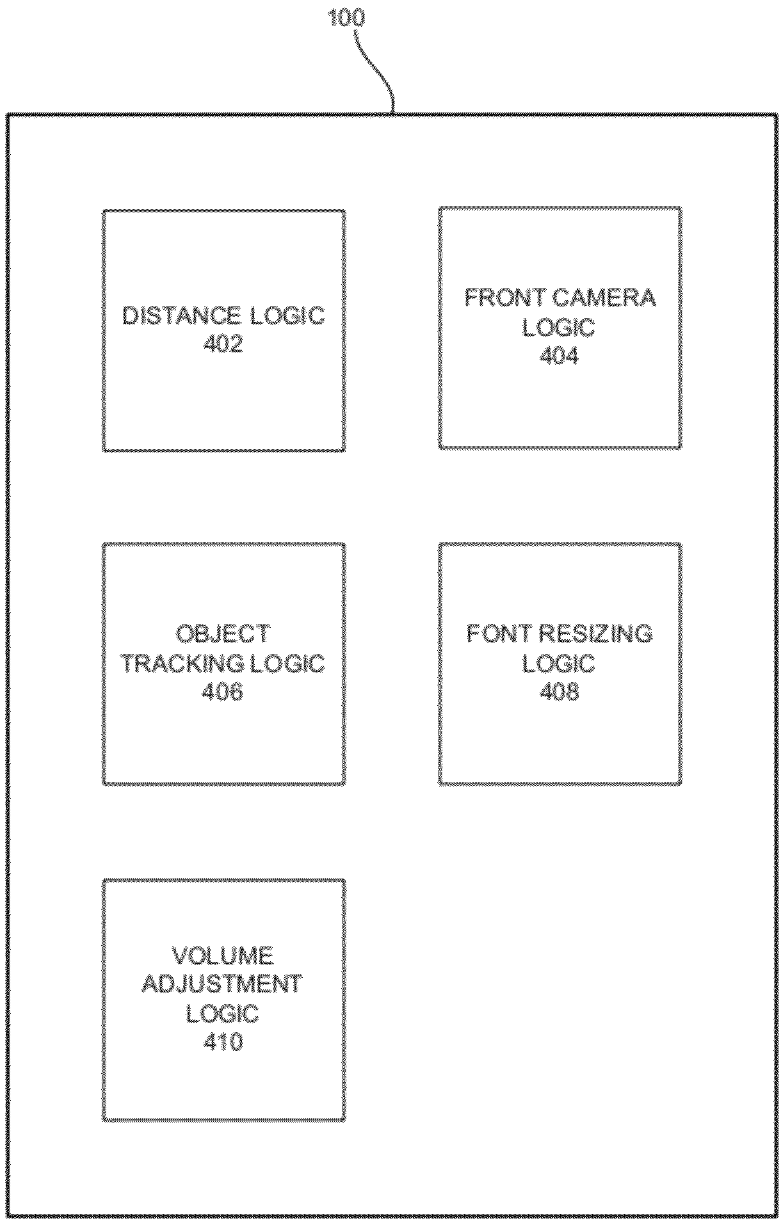
FIG. 4 is a block diagram of exemplary functional components of the device of FIGS. 1A and 1B.

FIG. 4 is a block diagram of exemplary functional components of device 100. As shown, device 100 may include distance logic 402, front camera logic 404, object tracking logic 406, font resizing logic 408, and volume adjustment logic 410. Functions described in connection with FIG. 4 may be performed, for example, by one or more components illustrated in FIG. 3. Furthermore, although not shown in FIG. 4, device 100 may include other components, such as an operating system (e.g., Linux, MacOS, Windows, etc.), applications (e.g., email client application, browser, music application, video application, picture application, instant messaging application, phone application, etc.), etc. Furthermore, depending on the implementation, device 100 may include additional, fewer, different, or different arrangement of components than those illustrated in FIG. 4.

Distance logic 402 may obtain the distance between device 100 and another object in front of device 102. To obtain the distance, distance logic 402 may receive, as input, the outputs from front camera logic 404 (e.g., a parameter associated with auto-focusing front camera 214), object tracking logic 406 (e.g., position information of an object detected in an image received via front camera 214), and sensors 216 (e.g., the output of a range finder, infrared sensor, ultrasound sensor, etc.). In some implementations, distance logic 402 may be capable of determining the distance between device 100 and user 102's eyes.

Front camera logic 404 may capture and provide images to object tracking logic 406. Furthermore, front camera logic 404 may provide parameter values that are associated with adjusting the focus of front camera 214 to distance logic 402. As discussed above, distance logic 402 may use the parameter values to determine the distance between device 100 and an object/user 102.

Object tracking logic 406 may determine and track the relative position (e.g., a position in a coordinate system) of a detected object within an image. Object tracking logic 406 may provide the information to distance logic 402, which may use the information to improve its estimation of the distance between device 100 and the object.

Figure 5A:
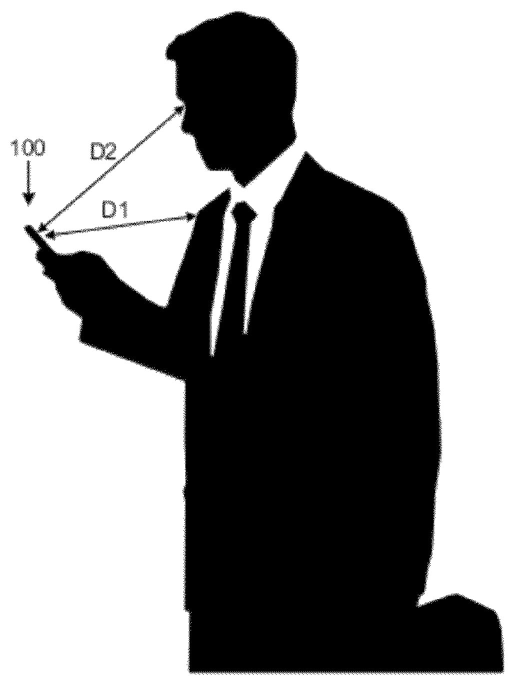
FIG. 5A illustrates operation of the exemplary distance logic of FIG. 4.

FIG. 5A illustrates an example of the process for determining the distance between device 100 and an object. Assume that distance logic 402 has determined the distance (shown as distance D1 in FIG. 5A) between user 102 and device 100, based on information provided by sensors 216 and/or front camera logic 404. Object tracking logic 406 may then detect user 102's eyes and provide the position (in an image) of user 102's eyes to distance logic 402. Subsequently, distance logic 402 may use the information and D1 to determine an improved estimate of the distance between device 100 and user 102's eyes (shown as D2).

Figure 5B:
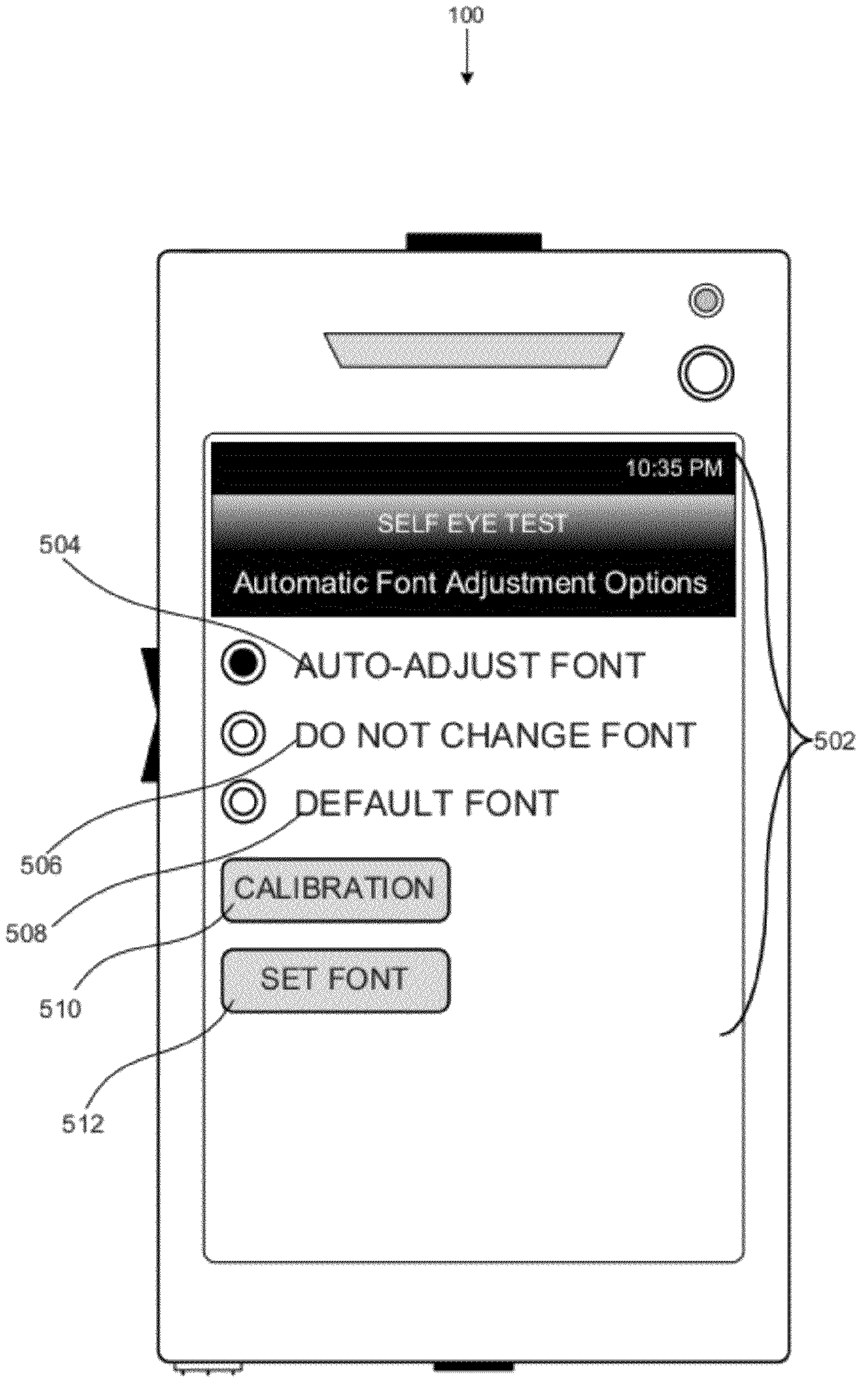
FIG. 5B illustrates an exemplary graphical user interface (GUI) that is associated with the exemplary font resizing logic of FIG. 4.

Returning to FIG. 4, font resizing logic 408 may provide a graphical user interface (GUI) for user 102 to select different options for adjusting font sizes of device 100. FIG. 5B shows an exemplary GUI menu 502 for selecting options for adjusting the font sizes. As shown, menu 502 may include an auto-adjust font option 504, a do not change font option 506, a default font option 508, a calibration button 510, and a set font size button 512. In other implementations, GUI menu 502 may include other options, buttons, links, and/or other GUI components for adjusting or configuring different aspects of fonts than those illustrated in FIG. 5B.

Auto-adjust font option 504, when selected, may cause device 100 to adjust its font sizes based on the screen resolution of display 202 and the distance between device 100 and user 102 or user 102's body part (e.g., user 102's eyes, user 102's face, etc.). Do not change font option 506, when selected, may cause device 100 to lock the font sizes of device 100. Default font option 100, when selected, may cause device 100 to re-set all of the font sizes to the default values.

Figure 5C:
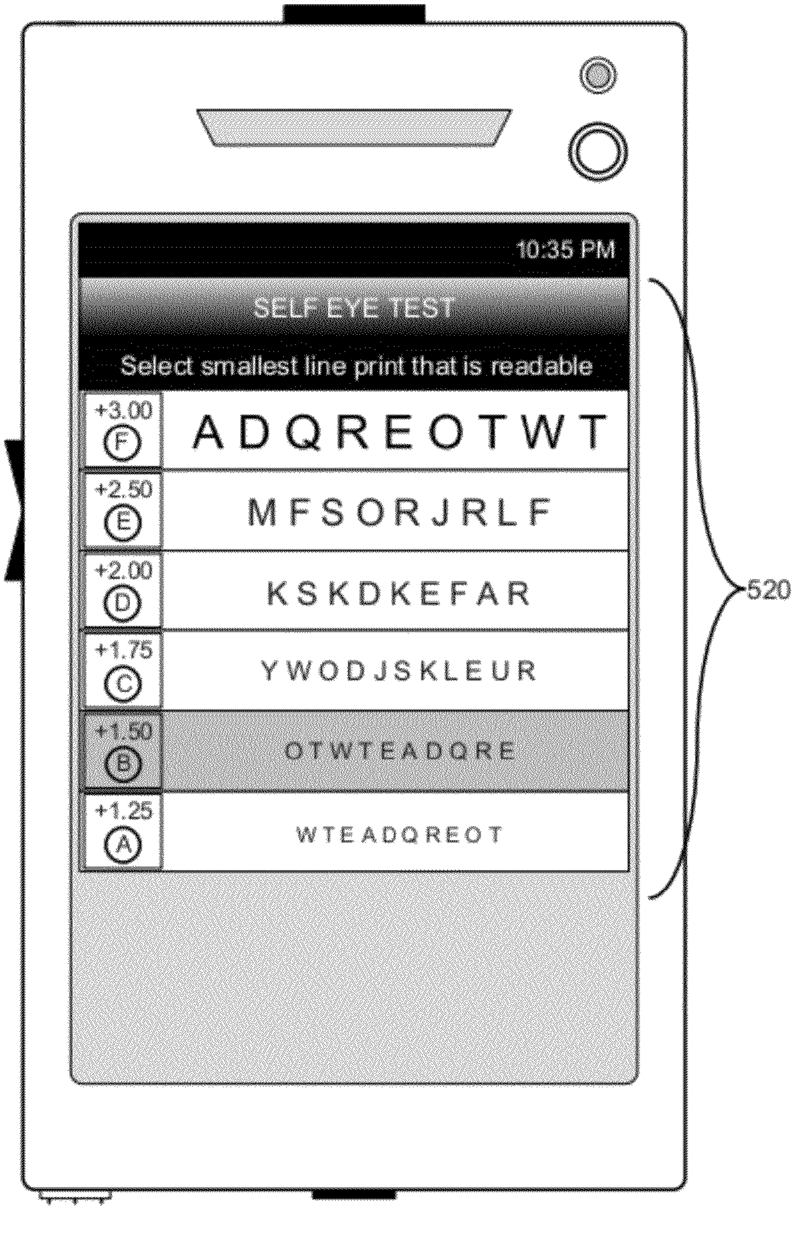
FIG. 5C illustrates an exemplary eye examination GUI that is associated with the font resizing logic of FIG. 4.

Calibration button 510, when selected, may cause device 100 to present a program for calibrating the font sizes to user 102. After the calibration, device 100 may use the calibration to adjust the font sizes based on the distance between device 100 and user 102. For example, in one implementation, when user 102 selects calibration button 510, device 100 may present user 102 with a GUI for conducting an eye examination. FIG. 5C illustrates an exemplary eye examination GUI 520. In presenting GUI 520 to user 102, font resizing logic 408 may adjust the font sizes of test letters in accordance with the resolution of display 202.

When user 102 is presented with eye examination GUI 520, user 102 may select the smallest font that user 102 can read at a given distance. Based on the selected font, font resizing logic 408 may select a baseline font size, which may or may not be different from the size of the selected font. Device 100 may automatically measure the distance between user 102 and device 100 when user 102 is conducting the eye examination via GUI 520, and may associate the measured distance with the baseline font size. Device 100 may store the selected size and the distance in memory 304.

Returning to FIG. 4, once the eye examination is finished, font resizing logic 408 may use the baseline font size and the measured distance (between user 102 and device 100 at the time of the eye examination) for modifying the current font sizes of device 100. For example, assume that user 102 has selected the fourth row of letters (e.g., "+1.50, B") in eye examination GUI 520 and determined the baseline font size based on the selected row of letters. In addition, assume that the measured distance between device 100 and user 102's eyes is 20 centimeters (cm). Device 100 may then increase or decrease the current font size relative to the baseline font size, depending on the current distance (hereafter X) between device 100 and user 102. More specifically, if 5 cm<X<10 cm, 10 cm<X<15 cm, 15 cm<X<20 cm, 20 cm<X<25 cm, 25 cm X<30 cm, or 30 cm<X 35 cm, then device 100 may change the system font sizes by −12%, −7%, −5%, 0%, +5%, +7%, etc., respectively, relative to the baseline font size. The ranges for X may vary, depending n the implementation (e.g., larger ranges for a laptop computer).

Because device 100 may include fonts of different sizes, depending on device configuration and selected options, font resizing logic 408 may change all or some of the system fonts uniformly (e.g., by the same percentage or points). In resetting the font sizes, font resizing logic 408 may have an upper and lower limit. The current font sizes may not be set larger than the upper limit and smaller than the lower limit.

In some implementations, font resizing logic 408 may determine the rate at which font sizes are increased or decreased as a function of the distance between device 100 and user 102. For example, assume that font resizing logic 408 allows (e.g., via a GUI component) user 102 to select one of three possible options: AGGRESSIVE, MODERATE, and SLOW. Furthermore, assume that user 102 has selected AGGRESSIVE. When user 102 changes the distance between device 100 and user 102, font resizing logic 408 may aggressively increase the font sizes (e.g., increase the font sizes at a rate greater than the rate associated with MODERATE or SLOW option). In some implementations, the rate may also depend on the speed of change in the distance between user 102 and device 100.

Depending on the implementation, font resizing logic 408 may provide GUI components other than the ones associated with the eye examination. For example, in some implementations, font resizing logic 408 may provide an input component for receiving a prescription number associated with one's eye sight or a number that indicates the visual acuity of the user (e.g., oculus sinister (OS) and oculus dexter (OD)). In other implementations, font resizing logic 408 may resize the fonts based on a default font size and a pre-determined distance that are factory set or configured by the manufacturer/distributor/vendor of device 100. In such an implementation, font resizing logic 408 may not provide for calibration (e.g., eye examination).

In some implementations, font resizing logic 408 may also resize graphical objects, such as icons, thumbnails, images, etc. Thus, for example, in FIG. 1A, each contact in the contact list of FIG. 1A shows an icon. When user 102 increases the distance between user 102 and device 100, font resizing logic 408 may enlarge each of the icons for the contacts.

In some implementations, font resizing logic 408 may affect other applications or programs in device 100. For example, font resizing logic 408 may configure a ZOOM IN/OUT screen, such that selectable zoom sizes are set at appropriate values for user 102 to be able to comfortably read words/letters on display 202.

Volume adjustment logic 410 may modify the speaker volume based on the distance between user 102 and device 100, as well as the ambient noise level. Similarly as font resizing logic 408, volume adjustment logic 410 may present user 102 with a volume GUI interface (not shown) for adjusting the volume of device 100. As in the case for GUI menu 502, the volume GUI interface may provide user 102 with different options (e.g., auto-adjust volume, do not auto-adjust, etc.), including the option for calibrating the volume.

When user 102 selects the volume calibration option, device 100 may request user 102 to select a baseline volume (e.g., via the volume GUI interface or another interface). Depending on the implementation, user 102 may select one of the test sounds that are played, or simply set the volume using a volume control (e.g., volume rocker 204). During the calibration, device 100 may measure the distance between device 100 and user 102, as well as the ambient noise level. Subsequently, device 100 may store the distance, the ambient noise level, and the selected baseline volume.

In some implementations, device 100 may use factory-set baseline volume level to increase or decrease speaker volume, as user 102 changes the distance between user 102 and device and/or as the surrounding noise level changes. In such implementations, device 100 may not provide for the user calibration of volume. Also, as in the case of font resizing logic 408, volume adjustment logic 410 may determine the rate at which the volume is increased or decreased as a function of the distance between device 100 and user 102.

Figure 6:
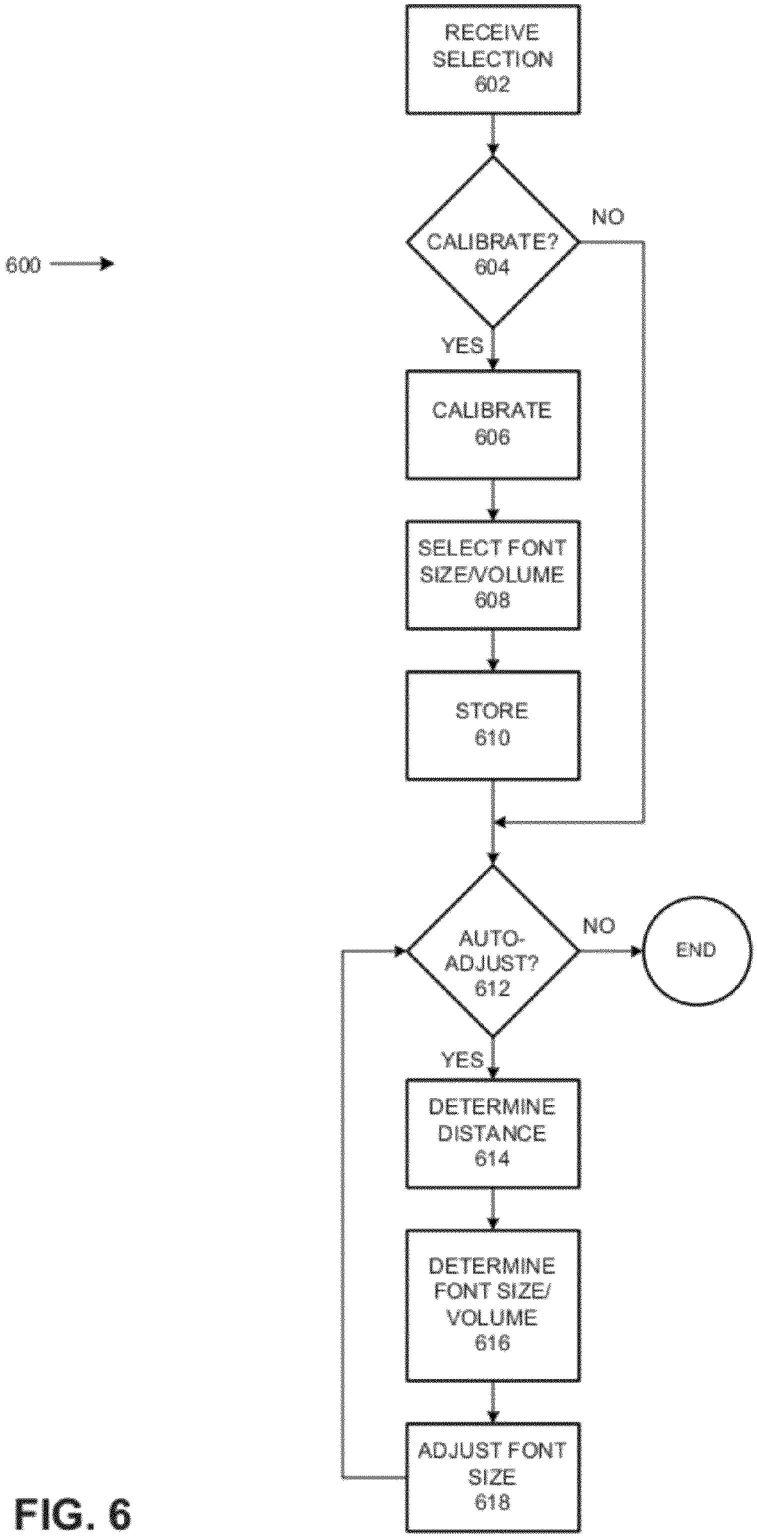
FIG. 6 is a flow diagram of an exemplary process for adjusting font sizes or speaker volume in the device of FIGS. 1A and 1B.

FIG. 6 is a flow diagram of an exemplary process 600 for adjusting font sizes/speaker volume on device 100. Assume that device 100 is turned on and that user 102 has navigated to a GUI menu for selecting options/components for adjusting font sizes (e.g., GUI menu 502) or speaker volume. Process 100 may begin by receiving user input for selecting one of the options in the GUI menu (block 602).

If user 102 has selected an option to calibrate device 100 (block 604: yes), device 100 (e.g., font resizing logic 408 or volume adjustment logic 410) may proceed with the calibration (block 606). As discussed above, in one implementation, the calibration may include performing an eye examination or a hearing test, for example, via an eye examination GUI 520 or another GUI for the hearing test (not shown). In presenting the eye examination or hearing test to user 102, device 100 may show test fonts of different sizes or play test sounds of different volumes to user 102.

In the case of the eye examination, the sizes of the test fonts may be partly based on the resolution of display 202. For example, because a 12-point font in a high resolution display may be smaller than the same 12-point font in a low-resolution display, font resizing logic 408 may compensate for the font size difference resulting from the difference in the display resolutions (e.g., render fonts larger or smaller, depending on the screen resolution). In a different implementation, the calibration may include a simple input or selection of a font size or an input of user 102's eye-sight measurement. In yet another implementation, font resizing logic 408 may not provide for user calibration. In such an implementation, font resizing logic 408 may adapt its font sizes relative to a factory setting.

In the case of the hearing test, in some implementations, rather than providing the hearing test, volume adjustment logic 410 may allow user 102 to input the volume level (e.g., via text) or to adjust the volume of a test sound.

Through the calibration, device 100 may receive the user selection of a font size (e.g., smallest font that user 102 can read) or a volume level. Based on the selection, device 100 may determine the baseline font size and/or the baseline volume level. For example, if user 102 has selected 10 dB as the minimum volume level at which user 102 can understand speech from device 100, device 100 may determine that the baseline volume is 15 dB (e.g., for comfortable hearing and understanding of the speech).

During the calibration, device 100 may measure the distance, between user 102 and device 100 and associate the distance with the baseline font size (or the size of the user selected font) or the baseline volume level. Device 100 may store the distance together with the baseline font size or the baseline volume level (block 610). Thereafter, device 100 may proceed to block 612. At processing block 604, if user 102 has not opted to calibrate device 100 (block 604: no), device 100 may proceed to block 612.

Device 100 may determine whether user 102 has configured font resizing logic 408 or volume adjustment logic 410 to auto-adjust the font sizes/volume on device 100 (block 612). If user 102 has not configured font resizing logic 408/volume adjustment logic 410 for auto-adjustment of font sizes or volume (block 612: no), process 600 may terminate. Otherwise, (block 612: yes), device 100 may determine the current distance between device 100 and user 102 (block 614).

As described above, font resizing logic 408 may determine the distance between user 102 and device 100 via distance logic 402. Distance logic 402 may receive, as input, the outputs from front camera logic 404, object tracking logic 406, and sensors 216 (e.g., the output of a range finder, infrared sensor, ultrasound sensor, etc.). In some implementations, distance logic 402 may be capable of determining the distance between device 100 and user 102's eyes.

Based on the current distance, device 100 may determine target font sizes/target volume level to which the current font sizes/volume may be set (block 616). For example, when the distance between user 102 and device 100 increases by 5%, font resizing logic 408 may set the target font sizes of 10, 12, and 14 point fonts to 12, 14, and 16 points, respectively, for increasing the font sizes. Similarly, volume adjustment logic 410 may set the target volume level for increasing the volume. Font resizing logic 408 or volume adjustment logic 410 may target font sizes or target volume that are smaller than the current font sizes or the current volume when the distance between user 102 and device decreases. In either case, font resizing logic 408 or volume adjustment logic 410 may not increase/decrease the font sizes or the volume beyond an upper/lower limit.

At block 618, device 100 may resize the fonts or change the volume in accordance with the target font sizes or the target volume level determined at block 616. Thereafter, process 600 may return to block 612.

As described above, device 100 may allow the user to easily recognize or read text on the display of device 100 or hear sounds from device 100. After user 102 calibrates the device, device 100 may adapt its font sizes, image sizes, and the speaker volume, depending on the distance between user 102 and device 100. Optionally, user 102 may adjust the aggressiveness with which the device changes its font/image sizes or volume. Furthermore, user 102 may turn off the font/image-size or volume adjusting capabilities of device 100.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, in some implementations, once device 100 renders changes in its font sizes or the volume, device 100 may wait for a predetermined period of time before rendering further changes to the font sizes or the volume. Given that device 100 held by user 102 may be constantly in motion, allowing for the wait period may prevent device 100 from needlessly changing font sizes or the volume.

While a series of blocks have been described with regard to the process illustrated in FIG. 6, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:

an output component to provide an audio or visual output;

a sensor to determine a distance between a user and the device;

one or more processors to:

obtain, as a baseline distance between the user and the device, a particular distance between the user and the device via the sensor;

provide test values for the audio or visual output to the user when the distance between the user and the device is the baseline distance;

determine a baseline value based on a test value selected from the test values according to the baseline distance;

after determining the baseline value, determine, via the sensor, a first current distance between the user and the device;

determine a first target value for the audio or visual output based on the first current distance, the baseline distance, and the baseline value;

provide, via the output component, an audio or visual output having a magnitude specified by the first target value;

determine a second current distance between the user and the device;

determine a second target value for the audio or visual output based on the second current distance, the baseline distance, and the baseline value; and provide, via the output component, the audio or visual output, changing a magnitude of the audio or visual output toward a magnitude specified by the second target value at a speed that is dependent on a user-specified speed preference and a speed of a change from the first current distance to the second current distance; and a memory to store the determined baseline value, associating with the obtained baseline distance.

2. The device of claim 1, wherein the baseline value, the first target value, and the second target value are represented by:

speaker volume; or a font size.

3. The device of claim 1, wherein the sensor includes:

a range finder; an ultrasound sensor; or an infrared sensor.

4. The device of claim 1, wherein when providing test values for the audio or visual output to the user when the distance between the user and the device is the baseline distance, the one or more processors are further configured to:

provide an eye examination to the user; or provide a hearing test to the user.

5. The device of claim 4, wherein when the one or more processors provide the eye examination to the user, the one or more processors are configured to:

determine sizes of test fonts to be displayed to the user based on a resolution of the display, wherein the one or more processors decreases the sizes of the test fonts when the resolution of the display increases, and increases the sizes of the test fonts when the resolution of the display decreases.

6. The device of claim 4, wherein when the one or more processors provide the eye examination to the user, the one or more processors are further configured to:

receive a user selection of a smallest font that the user can read.

7. The device of claim 6, wherein when the one or more processors determine the baseline value, the one or more processors are further configured to:

set the baseline value to be a size of approximately the smallest font that the user can read when the user and the device are apart by the baseline distance.

8. The device of claim 1, wherein the one or more processors is further configured to:

provide a plurality of characters to the user, wherein the plurality of characters have different font sizes, respectively;

receive a selection of a smallest font size, as selection of the test values, among the different font sizes, that the user can read at the particular distance; and set the baseline value to approximately the smallest font size.

9. The device of claim 1, wherein the one or more processors are further configured to: after changing the magnitude of the audio or visual output toward the second target value, wait for a predetermined period of time before rendering further changes to the magnitude of the audio or visual output.

10. The device of claim 1, wherein when the one or more processors determine the first target value, the one or more processors determines the first target value to be no greater than a predetermined upper limit.

11. A method comprising:

obtaining, as a baseline distance between the user and the mobile device, a particular distance between the user and the mobile device via a sensor;

providing test font sizes to the user when the distance between the user and the device is the baseline distance;

after determining the baseline font size, determining, via the sensor, a first current distance between the mobile device and the user;

determining a first target font size based on the first current distance, the baseline distance, and the baseline font size;

displaying, on the mobile device, characters in the font having the first target font size;

determining a second current distance between the user and the device;

determining a second target font size based on the second current distance, the baseline distance, and the baseline font size; and displaying, on the mobile device, character, changing a font size of the characters toward the second target font size at a user-selected speed.

12. The method of claim 11, wherein the sensor includes a component for auto-focusing a camera of the mobile device.

13. The method of claim 11, wherein providing test font sizes to the user when the distance between the user and the device is the baseline distance includes:

providing a graphical user interface for conducting an eye examination; or receiving user input that specifies visual acuity of the user.

14. The method of claim 13, wherein the conducting the eye examination includes:

receiving a user selection of a smallest font that the user can read at the distance; and determining the baseline font size to be approximately the smallest font.

15. The method of claim 13, wherein the providing the graphical user interface includes:

displaying test fonts whose sizes are determined based on a resolution of a display of the mobile device, wherein the test font sizes are decreased when the resolution of the display increases, and the test font sizes are increased when the resolution of the display decreases.

16. The method of claim 11, wherein the determining the first target font size includes: determining the first target font size to be no greater than a predetermined upper limit.

17. A non-transitory computer-readable medium, comprising computer-executable instructions for configuring one or more processors to:

obtain, as a baseline distance between a user and the mobile device, a particular distance between the user and the mobile device via the sensor;

provide test volume levels to the user when the distance between the user and the device is the baseline distance;

determine a baseline volume level based on a test volume level selected from the test volume levels according to the baseline distance;

determine, via the sensor, a first current distance between the user and the mobile device;

determine a first target volume level of the speaker based on at least the first current distance, the baseline distance, and the baseline volume level;

set a first current volume level of the speaker to the first target volume level of the speaker;

generate, from the mobile device, sounds having the first target volume level;

determine a second current distance between the user and the mobile device;

determine a second target volume level of the speaker based on at least the second current distance, the baseline distance, and the baseline value;

change a volume of the speaker at a speed that is dependent on a speed of a change from the first current distance to the second current distance; and generate, from the mobile device, sounds, changing a volume level of the sounds toward the second target volume level at a speed that is dependent on a user-specified speed preference and a speed of a change from the first current distance to the second current distance.

18. The non-transitory computer-readable medium of claim 17, further comprising computer-executable instruction for configuring the one or more processors to determine ambient noise, wherein the computer-readable medium further comprises computer-executable instruction for configuring the one or more processors to, when the one or more processors determine the first target volume level, determine the first target volume level of the speaker based on the first current distance, the distance, the baseline volume level, and the ambient noise level.

19. The non-transitory computer-readable medium of claim 17, wherein the computer-executable instruction for configuring the one or more processors to provide test volume levels to the user when the distance between the user and the device is the baseline distance includes a computer-executable instruction for configuring the one or more processors to provide a hearing test to the user.

20. The non-transitory computer-readable medium of claim 17, wherein the computer-executable instruction for configuring the one or more processors to determine the first target volume level includes a computer-executable instruction for configuring the one or more processors to determines the first target volume level to be no greater than a predetermined upper limit.

* * * * *